Dec. 25, 1956 I. M. SHIVACK 2,775,460

BINAURAL RECORDING SYSTEM

Filed May 15, 1951

INVENTOR
Ian M. Shivack
BY Philip G. Hilbert
ATTORNEY

United States Patent Office 2,775,460

Patented Dec. 25, 1956

2,775,460

BINAURAL RECORDING SYSTEM

Ian M. Shivack, Brooklyn, N. Y.

Application May 15, 1951, Serial No. 226,493

4 Claims. (Cl. 274—38)

This invention relates to a binaural recording system. More particularly, the invention concerns means and a method for recording or reproducing sound on flat discs in accordance with the binaural system.

Binaural recording systems have been proposed which use recording discs having a pair of related spiral grooves and therefore require a separate stylus and transducer for each groove to translate the sound recorded therein. Obviously, in such case, the double groove limits the total recording capacity of a single disc. It has also been proposed to use a disc having a single spiral groove which is formed with laterally and vertically disposed sound tracks, together with a single stylus for actuating a pair of transducers. With this arrangement, the concomitant movement of the single stylus in two directions, complicates the response of the transducers and is rather inflexible in operation.

Accordingly, an object of this invention is to provide an improved stylus means for use with a single groove record bearing laterally and vertically formed sound tracks, wherein the stylus means includes independent portions separately responsive to the two sound tracks, each stylus portion being directly connected to a transducer.

A further object of this invention, is to provide a method of reproducing sound from a record having a spiral groove including laterally and vertically undulating sound tracks by engaging the groove with a composite stylus having one portion responsive to one sound track and another portion responsive to the other sound track, and separately translating the vibrations of the respective stylus portions into audible, related sounds.

Another object of this invention is to provide sound recording means which includes a composite stylus in combination with a pair of transducers, the transducers and stylus being arranged relative to each other to allow operative connection between each transducer and a corresponding stylus member and allowing concomitant transmission of vibrations in planes at right angles to each other, from the stylus members to the transducers.

Still another object of this invention is to provide a stylus made up of coaxial members, each member being operatively connected to a transducer for transmitting vibrations thereto, one member being responsive to vibrations in a horizontal plane while the other member is responsive to vibrations in a vertical plane, each of the transducers being adapted to dampen the vibrations transmitted thereto by the movement of the stylus member connected to the other transducer.

Other objects will in part be obvious and in part hereinafter pointed out.

The invention accordingly consists in the features of construction, combinations of elements, arrangement of parts and procedural steps, which will be exemplified in the construction and method hereinafter described, and of which the scope of application will be indicated in the claims following.

In the accompanying drawing.

The invention is essentially directed to a stylus to be used in conjunction with a record disc formed with a single spiral groove having sound tracks impressed in the side and bottom walls thereof. Each track is formed in response to vibrations received from one of a pair of spaced microphones, in accordance with the binaural recording system. Such records, known in the art, have the sound track at the bottom of the groove made in response to vibrations in a vertical plane, while the sound track formed in the side walls of the groove, is derived from vibrations in a horizontal plane.

Figure 1:
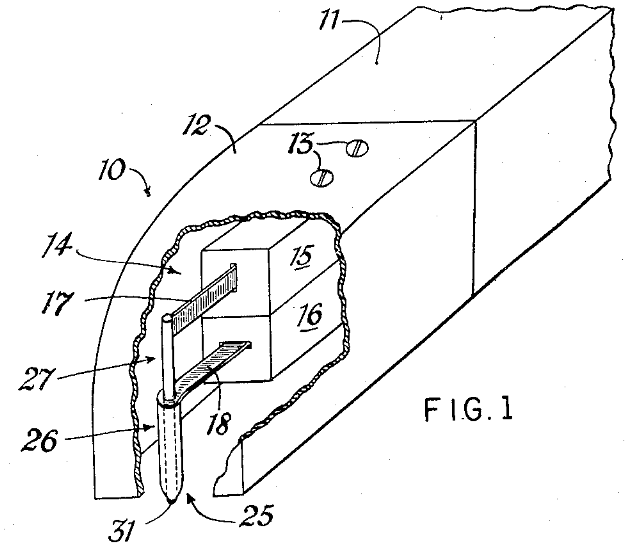
Fig. 1 is a perspective view of a device embodying the invention, with parts cut away.

Referring in detail to the drawing and particularly to Fig. 1, 10 designates a reproducing device embodying the invention. The same comprises an extended pick up arm 11 provided with a forward portion 12 which may be detachably secured thereto. The portion 12 may be of generally channel shaped cross section with the open portion thereof extending downwardly. Mounted on the underside of arm portion 12, by means of screws 13, is a reproducing unit generally designated as 14.

The unit 14 is made up of a pair of transducers 15, 16, each of which includes a transducer element, not shown, such as a piezo crystal, a variable reluctance or electromagnetic translating elements. Transducer 15 includes a movable arm 17 operatively connected to the transducer element and projecting forwardly thereof. Vibrations transmitted to arm 17 are in turn transmitted to the transducer element in a known manner. Similarly, transducer 16 includes a movable arm 18 operatively connected to its transducer element and projecting forwardly thereof. The transducers 15, 16 are arranged relative to each other so that arm 17 is primarily movable in a vertical plane while arm 18 is primarily movable in a horizontal plane. The transducers are suitably secured together with the arms 17, 18 arranged in accurate vertical and horizontal alignment, for the purpose hereinafter appearing.

Figures 2, 3:
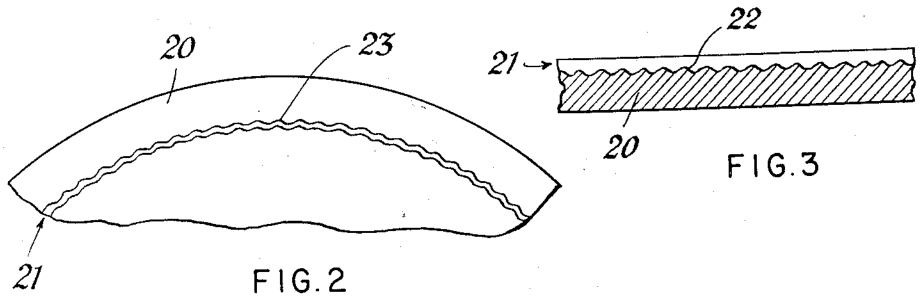
Fig. 2 is a plan view of a portion of a record, showing a groove with a laterally undulating sound track formed therein.
Fig. 3 is a sectional view thereof, showing a vertically undulating sound track formed therein.

In Figs. 2, 3, is shown a fragmentary portion of a record disc 20 which has a spiral groove 21. The groove has impressed or otherwise formed in the bottom wall thereof, a vertically undulating sound track or recording 22, while the side walls of the groove have impressed or cut therein a laterally undulating sound track or recording, such tracks being independently derived from spaced microphones in accordance with the binaural recording system.

Figure 4:
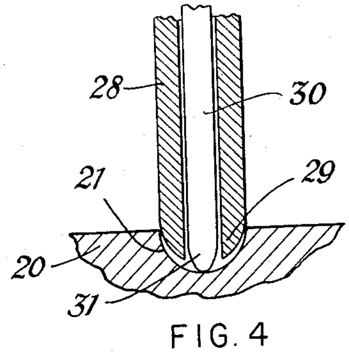
Fig. 4 is an enlarged vertical sectional view showing the lower portion of a stylus embodying the invention, engaging the groove of a record.

As shown in Figs. 1, 4, there is provided a composite stylus or follower 25 which is operatively connected to the reproducing unit 14 and is adapted to engage the groove 21 of record 20. The stylus 25 comprises a pair of coaxial members 26, 27. Member 26 takes the form of a tubular shank portion 28 which terminates at its lower end in an annular tip portion 29. The shank portion 28 is suitably connected at its upper end to the outer end of arm 18. Member 27 includes an elongated cylindrical shank portion 30 which is suitably connected at its upper end to the outer end of arm 17 and terminates at its lower end in a tip portion 31.

As shown in Fig. 4, the tip portion 31 projects somewhat beyond tip portion 29, whereby the former may engage the sound track 22 in record groove 21, while the latter simultaneously engages the sound track 23 of the same groove.

The transducers 15, 16 are of a standard type known in the art, wherein the vibration transmitting arms are primarily movable in a single direction to actuate the transducer element. Means is usually provided for damping or filtering transmitted vibrations having a direction other than said single direction. Such damping means may take the form of resilient pads of rubber or the like which are located along the opposite lateral edges of the transducer element, together with oppositely disposed rigid face plates which are secured along opposite side edges to the pads.

It will be apparent that the transducer 16 is positioned to allow normal lateral movement of arm 18 thereof, while transducer 15 is turned in relation to transducer 16 so that arm 17 thereof is adapted to move vertically and in alignment with arm 18. Furthermore, the concomitant movement of the stylus members 26, 27 as the stylus 25 moves in record groove 21, permits each member to independently transmit vibrations induced by the associated sound track, to the associated transducer. At the same time, any undesirable vibration transmitted to one member due to the concomitant movement of the coaxial members, will be damped or filtered and will not be translated by the transducer element.

The vibratory outputs of the respective stylus members are simultaneously translated through the respective transducers associated therewith and the translated outputs may be separately modified, amplified or otherwise controlled by the use of appropriate devices known in the art. Furthermore, the respective outputs may be mixed and modified in a common amplifying device to attain a desired composite output.

It is understood that the system described may be used in connection with any pair of recordings which may be intelligibly or otherwise related. Each of the recordings may be independent of the other and the recordings may be reproduced in any correlated relation desired. The system described may be used for recording as well as reproducing purposes, in which case the stylus members 26, 27 will function as sound track forming members in operative relation to recording microphones.

It will thus be seen that there is provided devices and methods for recording and reproducing sound in accordance with the binaural system, which is well adapted to meet the conditions of practical use and in which the several objects of the invention are achieved.

As various possible embodiments might be made of the above described invention, and as various changes might be made in the embodiments set forth, it is understood that all matter herein set forth or shown in the accompanying drawing is to be interpreted as illustrative and not in a limiting sense.

Having thus described my invention, I claim as new and desire to protect by Letters Patent:

1. An electric reproducing device for use with a disc having a groove provided with vertically undulating and laterally undulating sound tracks, comprising a pair of transducers, stylus means operatively connected with one of said transducers and including a shank and a tip for engaging one of said sound tracks and second stylus means operatively connected with the other of said transducers and including a cylindrical shank enclosing said first mentioned shank and a tip for simultaneously engaging the other of said sound tracks at a point coincident with the engaged portion of the first mentioned sound track.

2. In combination, a sound record having a sound track including laterally and vertically undulating portions, and means including a composite track follower having a pair of coaxially related inner and outer elongated members terminating in tip portions, the inner tip portion projecting beyond the outer tip portion for respectively engaging coincident parts of said track portions and for binaurally reproducing sound recordings from said track portions.

3. In a binaural system, means for reproducing recorded vibrations comprising a stylus including a pair of coaxial members, one of said members comprising a cylindrical shank portion terminating in an annular tip portion and being arranged to vibrate in a horizontal plane, the other of said members comprising an elongated shank portion disposed within the cylindrical portion of said one member and terminating in a tip portion projecting beyond the annular tip portion of said one member, said other member being arranged to vibrate in a vertical plane, and transducer means operatively connected to each of said members.

4. In a sound reproducing system, transducer means comprising a pair of transducers, said transducers including respective arms arranged for movement in directions at right angles to each other, said arms being disposed in vertical alignment, one of said arms being movable in a vertical plane, the other of said arms being movable in a horizontal plane, and stylus means comprising a pair of coaxial members terminating at one end thereof in tip portions, one of said members having a cylindrical shank portion enclosing the other member, said members being respectively connected at the other ends thereof to said arms, and said tip portions being in longitudinally offset relation with the inner tip portion projecting beyond the outer tip portion.

References Cited in the file of this patent

UNITED STATES PATENTS

| | | |
|---|---|---|
| 908,778 | Lamb | Jan. 5, 1909 |
| 1,260,586 | Smith | Mar. 26, 1918 |
| 1,262,592 | Nystrom | Apr. 9, 1918 |
| 1,276,759 | Hinckley et al. | Aug. 27, 1918 |
| 1,342,442 | Heck | June 8, 1920 |
| 1,457,313 | Morrison | June 5, 1923 |
| 1,520,357 | Lord | Dec. 23, 1924 |
| 1,520,378 | Waters | Dec. 23, 1924 |
| 1,855,150 | Jones | Apr. 19, 1932 |
| 1,877,625 | Laughridge | Sept. 13, 1932 |
| 2,458,418 | Rast | Jan. 4, 1949 |